US00RE37064E

(19) United States
(12) Reissued Patent
Aoyama et al.

(10) Patent Number: US RE37,064 E
(45) Date of Reissued Patent: Feb. 20, 2001

(54) PROCESS FOR PRODUCING STYRENIC POLYMER

(75) Inventors: Yoshiaki Aoyama; Norio Tomotsu, both of Ichihara (JP)

(73) Assignee: Idemitsu Kosan Co., Ltd., Tokyo (JP)

( * ) Notice: This patent is subject to a terminal disclaimer.

(21) Appl. No.: 09/505,723

(22) Filed: Feb. 17, 2000

Related U.S. Patent Documents

Reissue of:
(64) Patent No.: 5,756,612
Issued: May 26, 1998
Appl. No.: 08/711,795
Filed: Sep. 10, 1996

U.S. Applications:

(63) Continuation-in-part of application No. 08/413,224, filed on Mar. 30, 1995, now Pat. No. 5,596,055.

(30) Foreign Application Priority Data

Mar. 31, 1994 (JP) ..... 6-062491

(51) Int. Cl.[7] ..... C08F 4/46; C08F 12/08
(52) U.S. Cl. ..... 526/153; 526/127; 526/151; 526/160; 526/161; 526/164; 526/165; 526/346
(58) Field of Search ..... 526/127, 151, 526/153, 160, 161, 164, 165

(56) References Cited

U.S. PATENT DOCUMENTS

| | | | | |
|---|---|---|---|---|
| 4,680,353 | * | 7/1987 | Ishihara et al. | 526/160 |
| 5,023,304 | * | 6/1991 | Takeuchi et al. | 526/160 |
| 5,142,005 | * | 8/1992 | Albizzati et al. | 526/153 X |
| 5,250,629 | * | 10/1993 | Tani et al. | 526/336 X |
| 5,512,643 | * | 4/1996 | Newman et al. | 526/153 X |
| 5,596,055 | | 1/1997 | Aoyama et al. | 526/153 |
| 5,623,034 | | 4/1997 | Aoyama et al. | 526/160 |
| 5,756,612 | | 5/1998 | Aoyama et al. | 526/160 |
| 5,807,940 | | 9/1998 | Aoyama et al. | 526/160 |

OTHER PUBLICATIONS

EPC No. 95104346.2, filed Mar. 24, 1995, Publication No. 0675139, Oct. 4, 1995 which is equivalent to U.S. Parent Application, Ser. No. 08/413,224, filed Mar. 30, 1995.*
U.S. application No. 09/077,319, filed Jun. 5, 1998, allowed.
U.S. application No. 09/257,039, filed Feb. 25, 1999, pending.
U.S. application No. 09/505,723, filed Feb. 17, 2000, pending.

* cited by examiner

*Primary Examiner*—Fred Teskin
(74) *Attorney, Agent, or Firm*—Oblon, Spivak, McClelland, Maier & Neustadt, P.C.

(57) ABSTRACT

There is disclosed a process for producing a styrenic polymer, especially, syndiotactic polystyrene, which comprises polymerizing a styrenic monomer by the use of (a) a transition metal compound, (b) a coordination complex compound comprising an anion in which a plurality of radicals are bonded to a metal and a cation or methylaluminoxane, (c) an alkylating agent (alkyl group-containing aluminum, magnesium or zinc compound) and (d) a reaction product between a straight-chain alkylaluminum having at least two carbon atoms and water (alkylaluminoxane). The above process is capable of simplifying the production process and producing high-performance styrenic polymer having a high degree of syndiotactic configuration in high catalytic activity without deteriorating the catalyst activity, increasing the amounts of residual metals in the objective polymer or leaving the decomposition products of the alkylaluminum therein, thereby curtailing the production cost of the objective polymer.

7 Claims, No Drawings

PROCESS FOR PRODUCING STYRENIC POLYMER

Matter enclosed in heavy brackets [ ] appears in the original patent but forms no part of this reissue specification; matter printed in italics indicates the additions made by reissue.

This application is a continuation-in-part of application Ser. No. 08/413,224, filed Mar. 30, 1995, now U.S. Pat. No. 5,596,055.

BACKGROUND OF THE INVENTION

1. Field of the Invention

The present invention relates to a process for producing a styrenic polymer. More particularly, it pertains to a process for producing a styrenic polymer having a high degree of syndiotactic configuration efficiently and inexpensively.

2. Description of the Related Arts

In recent years, a process for producing a styrenic polymer having a syndiotactic configuration (hereinafter sometimes referred to as "SPS") by polymerizing a styrenic monomer by means of a catalyst comprising a transition metal compound as a primary ingredient, especially a titanium compound and methylaluminoxane (refer to Japanese Patent Application Laid-Open No. 187708/1987) has been proposed.

There has also been proposed a process for efficiently producing such a styrenic polymer (SPS) by the use of a catalyst comprising a coordination complex compound composed of an anion in which a plurality of radicals are bonded to a metal and a cation, while dispensing with an aluminoxane which is expensive and is to be used in a large amount (refer to Japanese Patent Application Laid-Open Nos. 415573/1990, 415574/1990, etc.)

In the case of polymerizing a styrenic monomer by the use of the above-mentioned catalyst, there has heretofore been employed an alkylaluminum as a chain transfer agent for the purpose of modifying the molecular weight of the objective polymer. However, this method involves the problems that the catalytic activity deteriorates resulting in an increase in the amounts of residual metals contained in the styrenic polymer thus produced, allowing the decomposed product of an alkylaluminum to remain in the objective polymer. Even in the case of raising the polymerization temperature, the deterioration of the catalytic activity increases the amount of residual metals in the objective polymer. The aforesaid situation calls for the development of a process capable of producing a styrenic polymer of high performance at a low cost, while enabling a decrease in the molecular weight of the resultant polymer and simplifying the process itself without deteriorating the catalytic activity.

As a result of intensive research and investigation made by the present inventors under such circumstances, it has been found that in the case of polymerizing a styrenic monomer by the use of a transition metal compound, a coordination complex compound composed of an anion in which a plurality of radicals are bonded to a metal and a cation, or methylaluminoxane, and an alkylating agent as principal components, the use of a reaction product between a straight-chain alkylaluminum having at least two carbon atoms and water can lower the molecular weight of the resultant polymer without deteriorating the catalytic activity. The present invention has been accomplished on the basis of the above-mentioned finding and information.

SUMMARY OF THE INVENTION

Specifically, the present invention provides a process for producing a styrenic polymer which comprises polymerizing a styrenic monomer by the use of (a) a transition metal compound, (b) a coordination complex compound comprising an anion in which a plurality of radicals are bonded to a metal and a cation, or methylaluminoxane, (c) an alkylating agent and (d) a reaction product between a straight chain alkylaluminum having at least two carbon atoms and water.

DESCRIPTION OF PREFERRED EMBODIMENT

As an (a) transition metal compound usable in the process of the present invention, mention may be made of a variety of compounds, usually the compound represented by the general formula (I) or (II)

$$MR^1_aR^2_bR^3_cR^4_{4-(a+b+c)} \quad (I)$$

$$MR^1_dR^2_eR^3_{3-(d+e)} \quad (II)$$

wherein M is a metal belonging to any of the groups 3 to 6 of the Periodic Table or a lanthanum series metal; $R^1$, $R^2$, $R^3$ and $R^4$ are each an alkyl group, an alkoxyl group, an aryl group, a cyclopentadienyl group, an alkylthio group, a substituted cyclopentadienyl group, an indenyl group, a substituted indenyl group, a fluorenyl group, a halogen atom or a chelating agent; a, b and c are each an integer of from 0 to 4; d and e are each an integer of from 0 to 3; and any two of $R^1$ to $R^4$ may form a complex which is crosslinked with $CH_2$, $Si(CH_3)_2$ or the like.

As a metal belonging to any of the groups 3 to 6 of the Periodic Table or a lanthanum series metal as indicated by M, there are preferably employed the group 4 metals, especially titanium, zirconium, hafnium and the like.

Various titanium compounds can be used and a preferred example is at least one compound selected from the group consisting of titanium compounds and titanium chelate compounds represented by the general formula (III) or (IV):

$$TiR^5_eR^6_fR^7_gR^8_{4-(a+b+c)} \quad (III)$$

$$TiR^5_hR^6_iR^7_{3-(d+e)} \quad (IV)$$

wherein $R^5$, $R^6$, $R^7$ and $R^8$ are each a hydrogen atom, an alkyl group having 1 to 20 carbon atoms, an alkoxyl group having 1 to 20 carbon atoms, an aryl group having 6 to 20 carbon atoms, an alkylaryl group, an arylalkyl group, an acyloxyl group having 1 to 20 carbon atoms, a cyclopentadienyl group, a substituted cyclopentadienyl group, an indenyl group, a substituted indenyl group, a fluorenyl group, an alkylthio group, an arylthio group, a chelating agent, an amino group, an amide group, a phosphorus-containing group or a halogen atom; a, b and c are each an integer from 0 to 4; a and e are each an integer from 0 to 3; and any two of $R^5$ to $R^8$ may form a complex which is crosslinked with $CH_2$, $Si(CH_3)_2$ or the like.

$R^5$, $R^6$, $R^7$ and $R^8$ in the general formulae (III) and (IV) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxyl group having 1 to 20 carbon atoms (specifically, methoxyl group, ethoxyl group, propoxyl group, butoxyl group, amyloxyl group, hexyloxyl group, and 2-ethylhexyloxyl group), an aryl group having 6 to 20 carbon atoms, an alkylaryl group, an arylalkyl group (specifically, phenyl group, tolyl group, xylyl group and benzyl group), an acyloxyl group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group, pentamethylcyclopentadienyl group and 4,5,6,7-tetrahydro-1,2,3-trimethylindenyl group), an indenyl group, a substituted indenyl group (specifically, methylindenyl group, dimethylindenyl group, tetramethylindenyl group and hexamethylindenyl group), a fluorenyl group, (specifically, methylfluorenyl group, dimethylfluorenyl group, tetramethylfluorenyl group and octamethylfluorenyl group), an alkylthio group (specifically, methylthio group, ethylthio group, butylthio group, amylthio group, isoamylthio group, isobutylthio group, octylthio group and 2-ethylhexylthio group), an arylthio group (specifically, phenylthio group, p-methylphenylthio group and p-methoxyphenylthio group), a chelating agent (specifically, 2,21-thiobis (4-methyl-6-tert-butylphenyl) group, or a halogen atom (specifically, chlorine, bromine, iodine and fluorine). These $R^5$, $R^6$, $R^7$, $R^8$ may be the same as or different from each other.

More desirable titanium compounds include a titanium compound represented by the formula (V)

$$TiRXYZ \quad (V)$$

wherein R represents a cyclopentadienyl group, a substituted cyclopentadienyl group, an indenyl group, a substituted indenyl group, a fluorenyl group, or the like; X, Y, and Z, independently of one another, are a hydrogen atom, an alkyl group having 1 to 12 carbon atoms, an alkoxyl group having 1 to 12 carbon atoms, an aryl group having 6 to 20 carbon atoms, an aryloxyl group having 6 to 20 carbon atoms, an arylalkyl group having 6 to 20 carbon atoms, an alkyl- or arylamide group having 1 to 40 carbon atoms or a halogen atom. Here, any one of X, Y and Z and R may form a compound which is crosslinked with $CH_2$, $SiR_2$ or the like.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group, 1,2,4-trimethylcyclopentadienyl group, 1,2,3,4-tetramethylcyclopentadienyl group, trimethylsilylcyclopentadienyl group, 1,3-di(trimethylsilyl) cyclopentadienyl group, tert-butylcyclopentadienyl group, 1,3-di(tert-butyl)cyclopentadienyl group, pentamethylcyclopentadienyl group or the like. In addition, X, Y, and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxyl group having 1 to 12 carbon atoms (specifically, methoxyl group, ethoxyl group, propoxyl group, butoxyl group, amyloxyl group, hexyloxyl group, octyloxyl group and 2-ethylhexyloxyl group), an aryl group having 6 to 20 carbon atoms (specifically, phenyl group and naphthyl group), an aryloxyl group having 6 to 20 carbon atoms (specifically, phenoxyl group), an arylalkyl group having 6 to 20 carbon atoms (specifically, benzyl group), an alkyl- or arylamide group having 1 to 40 carbon atoms (specifically, dimethylamide group, diethylamide group, diphenylamide group and methylphenylamide group) or a halogen atom (specifically, chlorine, bromine, iodine and fluorine).

Specific examples of the titanium compound represented by the general formula (V) include cyclopentadienyltrimethyltitanium, cyclopentadienyltriethyltitanium, cyclopentadienyltripropyltitanium, cyclopentadienyltributyltitanium, methylcyclopentadienyltrimethyltitanum, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxyltitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, (tert-butylamide)dimethyl (tetramethyl $\eta^5$-cyclopentadienyl)silanetitanium dichloride, (tert-butylamide)dimethyl)tetramethyl $\eta^5$-cyclopentadienyl) silanetitanium and (tert-butylamide)dimethyl(tetramethyl $\eta^5$-cyclopentadienyl)silanetitanium dimethoxide.

Of these titanium compounds, a compound not containing a halogen atom is preferred and a titanium compound having one $\pi$ electron type ligand is particularly desirable.

Furthermore, a condensed titanium compound represented by the general formula (VI) may be used as the titanium compound.

(VI)

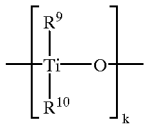

wherein $R^9$ and $R^{10}$ each represent a halogen atom, an alkoxyl group having 1 to 20 carbon atoms or an acyloxyl group; and k is an integer from 2 to 20.

Furthermore, the above titanium compounds may be used in the form of a complex formed with an ester, an ether or the like.

The trivalent titanium compound represented by the formula (VI) typically includes a trihalogenatd titanium such as titanium trichloride; and a cyclopentadienyltitanium compound such as cyclopentadienyltitanium dichloride, and also those obtained by reducing a tetravalent titanium compound. These trivalent titanium compounds may be used in the form of a complex formed with an ester, an ether or the like.

In addition, examples of the zirconium compound used as the transition metal compound include tetrabenzylzirconium, zirconium tetraethoxide, zirconium tetrabutoxide, bisindenylzirconium dichloride, triisopropoxyzirconium chloride, zirconium benzyldichloride and tributoxyzirconium chloride. Examples of the hafnium compound include tetrabenzylhafnium, hafnium tetraethoxide and hafnium tetrabutoxide. Examples of the vanadium compound include vanadyl bisacetylacetonato, vanadyl triacetylacetonato, vanadyl triethoxide and vanadyl tripropoxide. Of these transition metal compounds, the titanium compounds are particularly suitable.

Aside from the foregoing, the transition metal compounds constituting the component (a) include the transition metal compound with two ligands having conjugated $\pi$ electrons, for example, at least one compound selected from the group consisting of the transition metal compounds represented by the general formula:

$$M^1R^{11}R^{12}R^{13}R^{14} \quad \text{(VII)}$$

wherein $M^1$ is titanium, zirconium or hafnium; $R^{11}$ and $R^{12}$ are each a cyclopentadienyl group, substituted cyclopentadienyl group, indenyl group or fluorenyl group and $R^{13}$ and $R^{14}$ are each a hydrogen atom, a halogen atom, a hydrocarbon group having 1 to 20 carbon atoms, an alkoxyl group having 1 to 20 carbon atoms, an amino group or thioalkoxyl group having 1 to 20 carbon atoms, but $R^{11}$ and $R^{12}$ may be each crosslinked by a hydrocarbon group having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^{11}$ and $R^{12}$ in the general formula (VII) designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl) cyclopentadienyl group; 1,2,4-tri(tert-butyl) cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and crosslinked by an alkylidene group having 1 to 5 carbon atoms, more specifically, methine group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{13}$ and $R^{14}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition metal compounds represented by the general formula (VII) wherein $M^1$ is titanium include bis(cyclopentadienyl)dimethyltitanium; bis(cyclopentadienyl)diethyltitanium; bis(cyclopentadienyl)dipropyltitanium; bis(cyclopentadienyl)dibutyltitanium; bis(methylcyclopentadienyl)dimethyltitanium; bis(tert-butylcyclopentadienyl)dimethyltitanium; bis(1,3-dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(cyclopentadienyl)dimethyltitanium; bis(trimethylsilylcyclopentadienyl)dimethyltitanium; bis(1,3-di(trimethylsilyl)cyclopentadienyl)dimethyltitanium; bis(1,2,4-tris(trimethylsilyl)cyclopentadienyl)dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl)dimethyltitanium; ethylidenebis(2,3,4,5-tetramethylcyclopentadienyl)dimethyltitanium; dimethylsilylbis(2,3,4,5-tetramethylcyclopentadienyl)dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenebisfluorenyldimethyltitanium; dimethylsilylbisfluorenyldimethyltitanium; methylene(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilyl(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilyl(cyclopentadienyl)(fluorenyl)dimethyltitanium; methylene(indenyl)(fluorenyl)dimethyltitanium; ethylidene(indenyl)(fluorenyl)dimethyltitanium; dimethylsilyl(indenyl)(fluorenyl)dimethyltitanium; bis(cyclopentadienyl)dibenzyltitanium; bis(tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis[1,3-di-(trimethylsilyl)cyclopentadienyl]dibenzyltitanium; bis[1,2,4-tris(trimethylsilyl)cyclopentadienyl]dibenzyltitanium; bis(indenyl)dibenzyltitanium; bis(fluorenyl)dibenzyltitanium; methylenebis(cyclopentadienyl)dibenzyltitanium; ethylidenebis(cyclopentadienyl)dibenzyltitanium; methylenebis(2,3,4,5-tetramethylcyclopentadienyl)dibenzyltitanium; ethylidenebis(2,3,4,5-tetramethylcyclopentadienyl)dibenzyltitanium; dimethylsilylbis(2,3,4,5-tetramethylcyclopentadienyl)dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)dibenzyltitanium; ethylidenebis(fluorenyl)dibenzyltitanium; dimethylsilylbis(fluorenyl)dibenzyltitanium; methylene(cyclopentadienyl)(indenyl)dibenzyltitanium; ethylidene(cyclopentadienyl)(indenyl)dibenzyltitanium; dimethylsilyl(cyclopentadienyl)(indenyl)dibenzyltitanium; methylene(cyclopentadienyl)(fluorenyl)dibenzyltitanium; ethylidene(cyclopentadienyl)(fluorenyl)dibenzyltitanium; dimethylsilyl(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilyl(indenyl)

(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium dipheoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl) titanium dimethoxide; bispentamethylcyclopentadienyltitanium dimethoxide; bis (trimethylsilylcyclopentadienyl)titanium dimethoxide; bis [1,3-di(trimethylsilyl)cyclopentadienyl]titanium dimethoxide; bis [1,2,4-tri(trimethylsilyl)cyclopentadienyl] titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)titanium dimethoxide; ethylidenebis(2,3,4,5-tetramethylcyclopentadienyl)titanium dimethoxide; dimethylsilylenebis(2,3,4,5-tetramethylcyclopentadienyl) titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis (methylfluorenyl)titanium dimethoxide; ethylidenebisfluorenyltitanium dimethoxide; dimethylsilylbisfluorenyltitanium dimethoxide; methylene (cyclopentadienyl)(indenyl)titanium dimethoxide; ethylidene(cyclopentadienyl)(indenyl)titanium dimethoxide; dimethylsilyl(cyclopentadienyl)(indenyl)titanium dimethoxide; methylene(cyclopentadienyl)(fluorenyl) titanium dimethoxide; ethylidene(cyclopentadienyl) (fluorenyl)titanium dimethoxide; dimethylsilyl (cyclopentadienyl)(fluorenyl)titanium dimethoxide; methylene(indenyl)(fluorenyl)titanium dimethoxide; ethylidene(indenyl)(fluorenyl)titanium dimethoxide; and dimethylsilyl(indenyl)(fluorenyl)titanium dimethoxide.

Examples of the transition metal compounds represented by the formula (VII) wherein $M^1$ is zirconium include ethylidenebiscyclopentadienylzirconium dimethoxide and dimethylsilylbiscyclopentadienylzirconium dimethoxide. Examples of the hafnium compounds according to the general formula (VII) include ethylidenebiscyclopentadienylhafnium dimethoxide, dimethylsilylbiscyclopentadienylhafnium dimethoxide, etc. Particularly desirable transition metal compounds among them are titanium compounds. In addition to the combinations of the above, the compound may be a bidentate coordination complex compound such as 2,2'-thiobis-(4-methyl-6-tert-butylphenyl)titanium diisopropoxide; 2,2'-thiobis(4-methyl-6-tert-butylphenyl)titanium dimethoxide or the like.

As the transition metal compound of the component (a) usable in the present invention, there is available at least one compound selected from the group consisting of the transition metal compounds having the constitution represented by the general formula (VIII)

$$R'MX'_{p-1}L^1_q \qquad \text{(VIII)}$$

wherein R is, as a π ligand, a fused polycyclic cyclopentadienyl group wherein at least one of many-membered rings to which cyclopentadienyl groups are fusedly bonded is a saturated ring, M is as previously defined, X' is a σ ligand, a plurality of X' may be the same or different and bonded to each other through an arbitrary group, $L^1$ is a Lewis base, p is the valency of M, q is 0, 1 or 2 and when $L^1$ is plural, each $L^1$ may be the same or different. The above-mentioned fused polycyclic cyclopentadienyl group is exemplified by that selected from those represented by any one of the general formulae (IX) to (XI)

(IX)

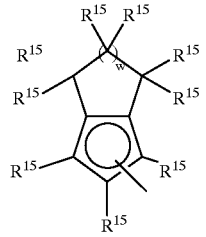

(X)

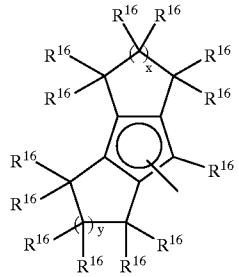

(XI)

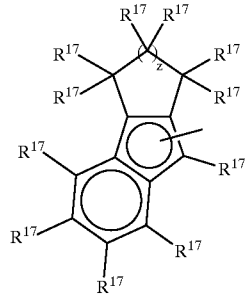

wherein $R^{15}$, $R^{16}$ and $R^{17}$ are each a hydrogen atom, a hydrogen atom, a halogen atom, an aliphatic hydrocarbon group having 1 to 20 carbon atoms, an aromatic hydrocarbon group having 6 to 20 carbon atoms, an alkoxyl group having 1 to 20 carbon atoms, an aryloxyl group having 6 to 20 carbon atoms, a thioalkoxyl group having 1 to 20 carbon atoms, a thioaryloxyl group having 6 to 20 carbon atoms, an amino group, an amide group, a carboxyl group or an alkylsilyl group and may be the same as or different from each other; and w, x, y and z are each an integer of 1 or greater. Of these, 4,5,6,7-tetrahydroindenyl group is preferable from the viewpoint of catalytic activity and the ease of its synthesis.

Specific examples of R' include 4,5,6,7-tetrahydroindenyl group; 1-methyl-4,5,6,7-tetrahydroindenyl group; 2-methyl-4,5,6,7-tetrahydroindenyl group; 1,2-dimethyl-4,5,6,7-tetrahydroindenyl group; 1,3-dimethyl-4,5,6,7-tetrahydroindenyl group; 1,2,3-trimethyl-4,5,6,7-tetrahydroindenyl group; 1,2,3,4,5,6,7-heptamethyl-4,5,6,7-tetrahydroindenyl group; 1,2,4,5,6,7-hexamethyl-4,5,6,7-tetrahydroindenyl group; 1,3,4,5,6,7-hexamethyl-4,5,6,7-tetrahydroindenyl group; octahydrofluorenyl group; 1,2,3,4-tetrahydrofluorenyl group; 9-methyl-1,2,3,4-tetrahydrofluorenyl group; and 9-methyl-octahydrofluorenyl group.

M is a Group 3 to 6 metal or a lanthanoids metal and exemplified by titanium, zirconium, hafnium, lanthanoids, niobium and tantalum. Of these titanium is preferable from the viewpoint of catalytic activity. X' is a σ ligand and is exemplified by a hydrogen atom, a halogen atom, an aliphatic hydrocarbon group having 1 to 20 carbon atoms, an aromatic hydrocarbon group having 6 to 20 carbon atoms, an alkoxyl group having 1 to 20 carbon atoms, an aryloxyl group having 6 to 20 carbon atoms, a thioalkoxyl group having 1 to 20 carbon atoms, a thioaryloxyl group having 6 to 20 carbon atoms, an amino group, an amide group, a carboxyl group or an alkylsilyl group, and a plurality of X' may be the same or different and bonded to each other through an arbitrary group. Further, X' is specifically exemplified by hydrogen atom, chlorine atom, bromine atom, iodine atom, methyl group, benzyl group, phenyl group, trimethylsilylmethyl group, methoxy group, ethoxy group, phenoxy group, thiomethoxy group, thiophenoxy group, dimethylamino group and diisopropylamino group. $L^1$ is a Lewis base, p is the valency of M and q is 0, 1 or 2.

As the transition metal compound represented by the general formula (VIII), there can preferably be employed a compound comprising R' and X' each arbitrarily selected from the above-exemplified groups.

The transition metal compound represented by the general formula (I) is specifically exemplified by but not limited to 4,5,6,7-tetrahydroindenyltitanium trichloride; 4,5,6,7-tetrahydroindenyltrimethyltitanium; 4,5,6,7-tetrahydroindenyltribenzyltitanium; 4,5,6,7-tetrahydroindenyltitanium trimethoxide; 1-methyl-4,5,6,7-tetrahydroindenyltitanium trichloride; 1-methyl-4,5,6,7-tetrahydroindenyltrimethyltitanium; 1-methyl-4,5,6,7-tetrahydroindenyltribenzyltitanium; 1-methyl-4,5,6,7-tetrahydroindenyltitanium trimethoxide; 2-methyl-4,5,6,7-tetrahydroindenyltitanium trichloride; 2-methyl-4,5,6,7-tetrahydroindenyltrimethyltitanium; 2-methyl-4,5,6,7-tetrahydroindenyltribenzyltitanium; 2-methyl-4,5,6,7-tetrahydroindenyltitanium trimethoxide; 1,2-dimethyl-4,5,6,7-tetrahydroindenyltitanium trichloride; 1,2-dimethyl-4,5,6,7-tetrahydroindenyltrimethyltitanium; 1,2-dimethyl-4,5,6,7-tetrahydroindenyltribenzyltitanium; 1,2-dimethyl-4,5,6,7-tetrahydroindenyltitanium trimethoxide; 1,3-dimethyl-4,5,6,7-tetrahydroindenyltitanium trichloride; 1,3-dimethyl-4,5,6,7-tetrahydroindenyltrimethyltitanium; 1,3-dimethyl-4,5,6,7-tetrahydroindenyltribenzyltitanium; 1,3-dimethyl-4,5,6,7-tetrahydroindenyltitanium trimethoxide; 1,2,3-trimethyl-4,5,6,7-tetrahydroindenyltitanium trichloride; 1,2,3-trimethyl-4,5,6,7-tetrahydroindenyltrimethyltitanium; 1,2,3-trimethyl-4,5,6,7-tetrahydroindenyltribenzyltitanium; 1,2,3-trimethyl-4,5,6,7-tetrahydroindenyltitanium trimethoxide; 1,2,3,4,5,6,7-heptamethyl-4,5,6,7-tetrahydroindenyltitanium trichloride; 1,2,3,4,5,6,7-heptamethyl-4,5,6,7-tetrahydroindenyltrimethyltitanium; 1,2,3,4,5,6,7-heptamethyl-4,5,6,7-tetrahydroindenyltribenzyltitanium; 1,2,3,4,5,6,7-heptamethyl-4,5,6,7-tetrahydroindenyltitanium trimethoxide; 1,2,4,5,6,7-hexamethyl-4,5,6,7-tetrahydroindenyltitanium trichloride; 1,2,4,5,6,7-hexamethyl-4,5,6,7-tetrahydroindenyltrimethyltitanium; 1,2,4,5,6,7-hexamethyl-4,5,6,7-tetrahydroindenyltribenzyltitanium; 1,2,4,5,6,7-hexamethyl-4,5,6,7-tetrahydroindenyltitanium trimethoxide; 1,3,4,5,6,7-hexamethyl-4,5,6,7-tetrahydroindenyltitanium trichloride; 1,3,4,5,6,7-hexamethyl-4,5,6,7-tetrahydroindenyltitanium trichloride; 1,3,4,5,6,7-hexamethyl-4,5,6,7-tetrahydroindenyltrimethyltitanium; 1,3,4,5,6,7-hexamethyl-4,5,6,7-tetrahydroindenyltribenzyltitanium; 1,3,4,5,6,7-hexamethyl-4,5,6,7-tetrahydroindenyltitanium trimethoxide; octahydrofluorenyltitanium trichloride; octahydrofluorenyltrimethyltitanium; octahydrofluorenyltribenzyltitanium; octahydrofluorenyltitanium trimethoxide; 1,2,3,4-tetrahydrofluorenyltitanium trichloride; 1,2,3,4-tetrahydrofluorenyltrimethyltitanium; 1,2,3,4-tetrahydrofluorenyltribenzyltitanium; 1,2,3,4-tetrahydrofluorenyltitanium trimethoxide; 9-methyl-1,2,3,4-tetrahydrofluorenyltitanium trichloride; 9-methyl-1,2,3,4-tetrahydrofluorenyltrimethyltitanium; 9-methyl-1,2,3,4-tetrahydrofluorenyltribenzyltitanium; 9-methyl-1,2,3,4-tetrahydrofluorenyltitanium trimethoxide; 9-methyloctahydrofluorenyltitanium trichloride; 9-methyloctahydrofluorenyltrimethyltitanium; 9-methyloctahydrofluorenyltribenzyltitanium; 9-methyloctahydrofluorenyltitanium trimethoxide; any of the above-mentioned compounds in which the titanium is replaced with zirconium or hafnium and a similar compound in which the transition metal element belongs to an other series or lanthnoids. Of these the titanium compounds are preferable from the viewpoint of catalytic activity.

There are available various coordination complex compounds comprising an anion in which a plurality of radicals are bonded to a metal to be used as the component (b) in the present invention, and there is preferably usable such a coordination complex compound as represented by the following general formula (XII) or (XIII):

$$([L^1-H]^{g+})_h([M^2X^1X^2 - - - X^n]^{(n-m)-})_i \quad \text{(XII)}$$

or $$([L^2]^{g+})_q([M^3X^1X^2 - - - X^n]^{(n-m)-})_i \quad \text{(XIII)}$$

wherein $L^2$ is $M^4$, $R^{18}R^{19}M^5$ or $R^{20}{}_3C$ as hereinafter described; $L_1$ is a Lewis base; $M^2$ and $M^3$ are each a metal selected from Groups 5 to 15 of the Periodic Table; $M^4$ is a metal selected from Groups 8 to 12 of the Periodic Table; $M^5$ is a metal selected from Groups 8 to 10 of the Periodic Table; $X^1$ to $X^n$ are each a hydrogen atom, a dialkylamino group, an alkoxyl group, an aryloxyl group, an alkyl group having 1 to 20 carbon atoms, an aryl group, an alkylaryl group or an arylalkyl group, each having 6 to 20 carbon atoms, a substituted alkyl group, an organometalloid group or a halogen atom; $R^{18}$ and $R^{19}$ are each a cyclopentadienyl group, a substituted cyclopentadienyl group, an indenyl group or a fluorenyl group; $R^{20}$ is an alkyl group; m is the valency of each of $M^2$ and $M^3$, indicating an integer of 1 to 7; n is an integer of 2 to 8; g is the ion valency of each of $[L^1-H]$ and $[L^2]$, indicating an integer of 1 to 7; h is an integer of 1 or more; and $j=h\times g/(n-m)$.

Specific examples of $M^2$ and $M^3$ include B, Al, Si, P, As, Sb, etc. in the form of atom; those of $M^4$ include Ag, Cu, etc. in the form of atom; and those of $M^5$ include Fe, Co, Ni, etc. in the form of atom. Specific examples of $X^1$ to $X^n$ include a dialkylamino group such as dimethylamino and diethylamino; an alkoxyl group such as methoxyl, ethoxyl and n-butoxyl; an aryloxyl group such as phenoxyl, 2,6-dimethylphenoxyl and naphthyloxyl; an alkyl group having 1 to 20 carbon atoms such as methyl, ethyl, n-propyl, iso-propyl, n-butyl, n-octyl and 2-ethylhexyl; an aryl group, an alkylaryl group or an arylalkyl group each having 6 to 20 carbon atoms, such as phenyl, p-tolyl, benzyl, pentafluorophenyl, 3,5-di(trifluoromethyl)phenyl, 4-tertbutylphenyl, 2,6-dimethylphenyl, 3,5-dimethylphenyl, 2,4dimethylphenyl and 1,2-dimethylphenyl; a halogen atom such as F, Cl, Br and I; and an organometalloid such as pentamethylantimony group, trimethylsilyl group, trimethylgermyl group, diphenylarsine group, dicyclohexylantimony group and diphenylboron group. Specific examples of substituted cyclopentadienyl group represented by any of $R^{18}$ and $R^{19}$ include methylcyclopentadienyl, butylcyclopentadienyl and pentamethylcyclopentadienyl.

Specific examples of the anion in which a plurality of radicals are bonded to a metal include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6F_5)_4^-$, $BF_4^-$, $PF_6^-$, $P(C_6F_5)_6^-$ and $Al(C_6HF_4)_4-$.

Specific examples of the metallic cation include $CpFe^+$, $(MeCp)_2Fe^+$, $(tBuCp)_2Fe^+$, $(Me_2Cp)_2Fe^+$, $(Me_3CP)_2Fe^+$, $(Me_4Cp)_2Fe^+$, $(Me_5Cp)_2Fe^+$, $Ag^+$, $Na^+$ and $Li^+$, a nitrogen atom-containing compound such as pyridinium, 2,4-dinitro-N,N-diethylanilinium, diphenylammonium, p-nitroanilinium, 2,5-dichloroaniline, p-nitro-N,N-dimethylanilinum, quinolinium, N,N-dimethylanilinum and N,N-diethylanilinium; a carbenium compound such as triphenylcarbenium, tri(4-methylphenyl)carbenium and tri(4-methoxyphenyl)carbenium; an alkylphosphonium ion such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$ and $(C_3H_7)_4P^+$; and an arylphosphonium ion such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$ and $(C_2H_5)_2(C_6H_5)_2P^+$.

Among the compounds represented by the general formula (XII) or (XIII), specific examples of preferably usable compounds include, as the compound of the general formula (XII), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, pyridinium tetra(pentafluorophenyl))borate, pyrrolinium tetra(pentafluorophenyl)borate, N,N-dimethylanilinium tetra(pentafluorophenyl)borate and methyldiphenylammonium tetra(pentafluorophenyl)borate, and as the compound of the general formula (XIII), ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityl tetraphenylborate, trityl tetra(pentafluorophenyl)borate, silver hexafluoroarsenate, silver hexafluoroantimonate and silver tetrafluoroborate.

Methylaluminoxane may be used as the component (b) in addition to or in place of the coordination complex compound comprising an anion in which a plurality of radicals are bonded to a metal and a cation.

There are available various alkylating agents as the component (c), which are exemplified by the aluminum compound having an alkyl group represented by the general formula (XV)

$$R^{21}_{m'}Al\,(OR^{22})_{n'}X_{3-m'-n'} \qquad \text{(XV)}$$

wherein $R^{21}$ and $R^{22}$ are each an alkyl group having 1 to 8, preferably 1 to 4 carbon atoms, X is a hydrogen atom or a halogen atom, m' satisfies the relation $0<m'\leqq 3$, desirably m'=2 or 3, most desirably m'=3, and n' satisfies the relation $0\leqq n'<3$, desirably n'=0 or 1; the magnesium compound having an alkyl group represented by the general formula (XVI)

$$R^{21}{}_2Mg \qquad \text{(XVI)}$$

wherein $R^{21}$ is as previously defined;

the zinc compound having an alkyl group represented by the general formula (XVII)

$$R^{21}{}_2Zn \qquad \text{(XVII)}$$

wherein $R^{21}$ is as previously defined; and the like.

The aforesaid compounds each having an alkyl group are preferably aluminum compounds each having an alkyl group, more desirably trialkylaluminum compounds and dialkylaluminum compounds, and specifically exemplified by trialkylaluminum such as trimethylaluminum, triethylaluminum, tri-n-propylaluminum, triisopropylaluminum, tri-n-butylaluminum, triisobutylaluminum and tri-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum hydride such as dimethylaluminum hydride, diethylaluminum hydride and diisobutylaluminum hydride, dialkylmagnesium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

As described hereinbefore, the process according to the present invention comprises polymerizing a styrenic monomer by the use of the catalyst composed of the components (a), (b) and (c) and incorporating in the polymerization system, a (d) reaction product between a straight chain alkylaluminum having at least two carbon atoms in the alkyl group as represented by the general formula (XVIII) and water.

$$R^{o}{}_3Al \qquad \text{(XVIII)}$$

wherein $R^{o}$ is a straight chain alkyl group having 2 to 10, preferably 2 to 6 carbon atoms. Specific examples of such alkylaluminum include triethylaluminum, tri-n-propylaluminum, tri-n-butylaluminum, tri-n-pentylaluminum, tri-n-hexylaluminum and tri-n-heptylaluminum.

The water to be reacted with the straight chain alkylaluminum may be any of ice, water, steam, an organic solvent saturated with water and water of crystallization.

The reaction product between such a straight chain alkylaluminum and water to be used in the present invention is obtained by reacting the above-mentioned straight chain alkylaluminum with water in a molar ratio of 1:(1 to 2) at a temperature of −78° to 100° C. in a organic solvent without active hydrogen atom, and is represented by the general formula (XIX) or (XX)

(XIX)

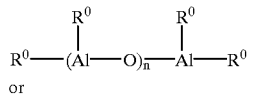

or

-continued (XX)

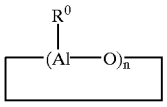

wherein $R^o$ is as previously defined and n is an integer from 1 to 20. Specific examples of these compounds include ethylaluminoxane, propylaluminoxane, butylaluminoxane, pentylaluminoxane, hexylaluminoxane and heptylaluminoxane.

The above-mentioned compound represented by the general formula (XIX) or (XX) has preferably n of 1 to 5 and may be used alone or in combination with at least one other one.

In the case of carrying out the process of the present invention, the aforesaid components (a), (b), (c) and (d) may be added, separately one by one, to the monomer to be polymerized, or may be premixed with a solvent (aromatic hydrocarbon such as toluene, and ethylbenzene or aliphatic hydrocarbon such as hexane and heptane) prior to mixing with the monomer, in which the components (c) and (d) may totally or partly be added to the monomer.

The addition of the aforesaid components (a), (b), (c) and (d) to the monomer can be carried out at a temperature of 0° to 100° C., needless to say, at a polymerization temperature.

The above-described catalyst along with the chain transfer agent exhibit a high activity in the production of a styrenic polymer having a high degree of syndiotactic configuration.

The molecular weight of the resultant polymer can be lowered by the addition of the component (d), but the amount thereof to be added is not specifically limited, since it varies depending on the type of each of the components (a), (b), (c) and (d), the monomer species and polymerization conditions such as polymerization temperature.

In the production of a styrenic polymer by the process according to the present invention, a styrenic monomer or monomers or a styrenic derivative or derivatives is homopolymerized or are copolymerized in the present of a catalyst composed mainly of the components (a), (b) and (c) and chain transfer agent of the component (d).

As the styrenic monomer, there is preferably used a compound represented by the general formula (XXI)

(XXI)

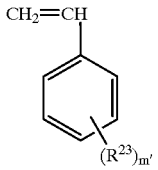

wherein $R^{23}$ is hydrogen atom, a halogen atom or a hydrocarbon group having 1 to 20 carbon atoms, m' is an integer from 1 to 3 and, when m' is 2 or greater, a plurality of $R^{23}$ may be the same or different.

Examples of the compound of the general formula (XXI) include styrene; alkylstyrenes such as p-methylstyrene; m-methylstyrene; o-methylstyrene; 2,4-dimethylstyrene; 2,5-dimethylstyrene; 3,4-dimethylstyrene; 3,5-dimethylstyrene; and p-tertiary-butylstyrene; polyvinylbenzenes such as p-divinylbenzene; m-divinylbenzene; and trivinylbenzene; halogenated styrenes such as p-chlorostyrene; m-chlorostyrene; o-chlorostyrene; p-bromostyrene; m-bromostyrene; o-bromostyrene; p-fluorostyrene; m-fluorostyrene; o-fluorostyrene and o-methyl-p-fluorostyrene; alkoxystyrenes such as methoxystyrene; ethoxystyrene; and tert-butyoxystyrene; and a mixture of at least two of them.

The polymerization of the styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerization temperature is not specifically limited, but is usually in the range of 20° to 120° C., preferably 20° to 90° C. In addition, the polymerization reaction may be carried out in the presence of hydrogen in order to modify the molecular weight of the styrenic polymer to be produced.

The styrenic polymer thus obtained possesses a high degree of syndiotactic configuration in its polymerization chain of the styrenic monomer. Here, the styrenic polymer having a high degree of syndiotactic configuration in its polymerization chain of the styrenic monomer means that its stereochemical structure is mainly of syndiotactic configuration, i.e. the stereostructure in which phenyl groups or substituted phenyl group as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural unit are connected to each other. "-The styrenic polymers having a high degree of syndiotactic configuration" as mentioned in the present invention means polystyrene, poly(alkylstyrene), poly(halogenated styrene), poly(alkoxystyrene), poly(vinylbenzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(methylstyrene), poly(ethylstyrene) poly (isopropylstyrene), poly(tert-butylstyrene), etc., poly (halogenated styrene) includes poly(chlorostyrene), poly (bromostyrene), and poly(fluorostyrene), etc. The poly (alkoxystyrene) includes poly(methoxystyrene), poly (ethoxystyrene), etc. The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

As described hereinbefore, the process according to the present invention makes it possible to attain a high activity in the production of a styrenic polymer having a high degree of syndiotactic configuration, decrease the amount of the residual metals in the resultant styrenic polymer without deterioration of the catalytic activity by the use of a reaction product between the specific straight chain alkylaluminum and water, and at the same time, to simplify the production process of the styrenic polymer and curtail the production cost thereof.

In the following, the present invention will be described in more detail with reference to comparative examples and examples, which however, shall not be construed to limit the present invention thereto.

EXAMPLE 1

(1) Synthesis of ethylaluminoxane

In a 5 liter (hereinafter abbreviated to "L") vessel which had been dried and purged with nitrogen was placed 178 milliliter (hereinafter abbreviated to "mL") of 0.5 mol/L solution of triethylaluminum in 112 mL of toluene. To the resultant mixture was gradually added dropwise under sufficient stirring at room temperature, 1.67 L solution in toluene ($H_2O$; $430.7\times10^{-6}$ g/mL) which had been adjusted in water content by means of ion-exchanged water. After the completion of the dropwise addition, the toluene was distilled away to form 8.5 g of product.

(2) Polymerization of styrene

In a 50 mL vessel which had been dried and purged with nitrogen were successively placed 0.4 mL of 2 moles/L of triisobutylaluminum in 39.3 mL of toluene, 64 mg of dimethylanilinium tetra(pentafluorophenyl)borate, and 0.32 mL of 250 mmol of pentamethylcyclopentadienyltitanium trimethoxide to prepare a preliminary mixed catalyst. In a 30 mL vessel which had been dried and purged with nitrogen were placed 10 mL of styrene and 45 $\mu$L of 0.28 mol/L of ethylaluminoxane with heating to 70° C. and 250 $\mu$L of the preliminary mixed catalyst as prepared above to polymerize the styrene for 1 hour. After the completion of the reaction, the reaction product was dried to afford 2.99 g of a polymer. The resultant polymer was cut into slices of at most 1 mm in thickness, which were subjected to Soxhlet extraction for 6 hours by the use of methyl ethyl ketone (MEK) as the solvent to produce MIP (MEK-insoluble portion). As a result, objective SPS having a molecular weight of 310,000 was obtained in a yield of 2.83 g with a raffinate (MIP) rate of 94.8% and an activity for SPS of 118 kg/g-Ti.

EXAMPLE 2

The procedure in Example 1 (2) was repeated to obtain 2.87 g of a polymer except that the addition amount of 0.28 mol/L of ethylaluminoxane was set on 90 $\mu$L in place of 45 $\mu$L. The resultant polymer was subjected to Soxhlet extraction for 6 hours by the use of methyl ethyl ketone (MEK) as the solvent to produce MIP. As a result, objective SPS having a molecular weight of 240,000 was obtained in a yield of 2.80 g with a raffinate (MIP) rate of 97.6% and an activity for SPS of 117 kg/g-Ti.

EXAMPLE 3

The procedure in Example 1 (2) was repeated to obtain 2.87 g of a polymer except that there was used n-butylaluminoxane which had been prepared in the same manner as in Example 1 (1) in place of ethylaluminoxane. The resultant polymer was subjected to Soxhlet extraction for 6 hours by the use of methyl ethyl ketone (MEK) as the solvent to produce MIP. As a result, objective SPS having a molecular weight of 350,000 was obtained in a yield of 2.81 g with a raffinate (MIP) rate of 97.9% and an activity for SPS of 117 kg/g-Ti.

EXAMPLE 4

The procedure in Example 1 (2) was repeated to obtain a polymer except that there was used n-propylaluminoxane which had been prepared in the same manner as in Example 1 (1) in place of ethylaluminoxane. The resultant polymer was subjected to Soxhlet extraction for 6 hours by the use of methyl ethyl ketone (MEK) as the solvent to produce MIP. As a result, objective SPS having a molecular weight of 340,000 was obtained with a raffinate (MIP) rate of 95% and an activity for SPS of 120 kg/g-Ti.

EXAMPLE 5

The procedure in Example 1 (2) was repeated to obtain a polymer except that there was used ferrocenium tetra (pentafluorenyl)borate in place of dimethylanilinium tetra (pentafluorenyl)borate. The resultant polymer was subjected to Soxhlet extraction for 6 hours by the use of methyl ethyl ketone (MEK) as the solvent to produce MIP. As a result, objective SPS having a molecular weight of 320,000 was obtained with a raffinate (MIP) rate of 95% and an activity for SPS of 122 kg/g-Ti.

EXAMPLE 6

The procedure in Example 1 (2) was repeated to obtain a polymer except that there was used tri-n-butylaluminum in place of triisobutylaluminum. The resultant polymer was subjected to Soxhlet extraction for 6 hours by the use of methyl ethyl ketone (MEK) as the solvent to produce MIP. As a result, objective SPS having a molecular weight of 310,000 was obtained with a raffinate (MIP) rate of 95% and an activity for SPS of 119 kg/g-Ti.

Comparative Example 1

The procedure in Example 1 (2) was repeated to obtain a polymer except that ethylaluminoxane was not used. The resultant polymer was subjected to Soxhlet extraction for 6 hours by the use of methyl ethyl ketone (MEK) as the solvent to produce MIP. As a result, objective SPS having a molecular weight of 871,000 was obtained in a yield of 2.69 g with a raffinate (MIP) rate of 95.5% and an activity for SPS of 112 kg/g-Ti.

Example A

The procedure in Example 1 (2) was repeated except that 4.0 mL of 1.6 mol/L of methylaluminoxane solution was used in place of 64 mg of dimethylanilinium tetra (pentafluorophenyl)borate. As a result, objective SPS having a molecular weight of 340,000 was obtained in a yield of 3.25 g with a raffinate (MIP) rate of 96.4% and an activity for SPS of 138 kg/g-Ti.

Example B

The procedure in Example 1 (2) was repeated except that 0.5 mmol of butylethylmagnesium was used in place of 0.4 mL of 2 mol/L of triisobutylaluminum and 4.0 mL of 1.6 mol/L of methylaluminoxane solution was used in place of 64 mg of dimethylanilinium tetra(pentafluorophenyl)borate. As a result, object SPS having a molecular weight of 370,000 was obtained in a yield of 2.25 g with a raffinate (MIP) rate of 94.4% and an activity for SPS of 93 kg/g-Ti.

Comparative Example A

The procedure in Example 1 (2) was repeated except that 1.0 mL of 2.0 mol/L of trimethylaluminum solution was used in place of 64 mg of dimethylanilinium tetra (pentafluorophenyl)borate. As a result, objective SPS having a molecular weight of 270,000 was obtained in a yield of 0.95 g with a raffinate (MIP) rate of 90.5% and an activity for SPS of 38 kg/g-Ti.

What is claimed is:

1. A process for producing a styrenic polymer having a high degree of syndiotacticity, which comprises:

polymerizing a styrenic monomer in the presence of a catalyst of (a) a transition metal compound, (b) methylaluminoxane, (c) at least one alkylating agent selected from the group consisting of triethylaluminum, tri-n-propylaluminum, triisopropylaluminum, tri-n-butylaluminum, triisobutylaluminum, tri-tert-butylaluminum, dialkylaluminumhalide, dialkylmagnesium and dialkylzinc, and (d) a reaction product between a straight-chain alkylaluminum having at least 2 carbon atoms in the alkyl group as represented by formula (XVIII) and water:

$$R^o{}_3Al \qquad \text{(XVIII)}$$

wherein $R^o$ is a straight-chain alkyl group having 2 to 10 carbon atoms.

2. The process according to claim 1 wherein the reaction product as the component (d) is a compound represented by formula

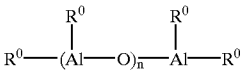

or

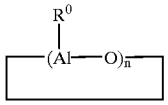

wherein $R^o$ is a straight-chain alkyl group having 2 to 10 carbon atoms and n is an integer of 1 to 20.

3. The process according to claim 1 wherein the reaction product as the component (d) is at least one member selected from the group consisting of ethylaluminoxane, propylaluminoxane, butylaluminoxane, pentylaluminoxane, hexylaluminoxane and heptylaluminoxane.

4. The process according to claim 1, wherein (a) said transition metal compound is of formula (I), (II), (VI) or (VII):

$$MR^1{}_aR^2{}_bR^3{}_cR^4{}_{4-(a+b+c)} \qquad \text{(I)}$$

$$MR^1{}_dR^2{}_eR^3{}_{3-(d+e)} \qquad \text{(II)}$$

wherein M is a metal belonging to any of the groups 3 to 6 of the Periodic Table or a lanthanum series metal; $R^1$, $R^2$, $R^3$ and $R^4$ are each an alkyl group, an alkoxy group, an aryl group, a cyclopentadienyl group, an alkylthio group, a substituted cyclopentadienyl group, an indenyl group, a substituted indenyl group, a fluorenyl group, a halogen atom or a chelating agent; a, b and c are each an integer of from 0 to 4; d and e are each an integer of from 0 to 3; and any two of $R^1$ to $R^4$ may form a complex which is crosslinked with $CH_2$ or $Si(CH_3)_2$;

(VI)

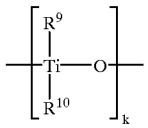

wherein $R^9$ and $R^{10}$ each represent a halogen atom, an alkoxyl group having 1 to 20 carbon atoms or an acyloxyl group; and k is an integer of from 2 to 20;

$$M^1R^{11}R^{12}R^{13}R^{14} \qquad \text{(VII)}$$

wherein $m^1$ is titanium, zirconium or hafnium; $R^{11}$ and $R^{12}$ are each a cyclopentadienyl group, a substituted cyclopentadienyl group, an indenyl group or a fluorenyl group and $R^{13}$ and $R^{14}$ are each a hydrogen atom, a halogen atom, a hydrocarbon group having 1 to 20 carbon atoms, an alkoxyl group having 1 to 20 carbon atoms, an amino group or thioalkoxyl group having 1 to 20 carbon atoms, but $R^{11}$ and $R^{12}$ may be each crosslinked by a hydrocarbon group having 1 to 5 carbon atoms, an alkylsilyl group having 1 to 20 carbon atoms and 1 to 5 silicon atoms or a germanium-containing hydrocarbon group having 1 to 20 carbon atoms and 1 to 5 germanium atoms.

5. The process according to claim 4, wherein M or $M^1$ is titanium.

6. The process according to claim 4, wherein $R^1$ is a cyclopentadienyl group, a substituted cyclopentadienyl group, an indenyl group or a substituted indenyl group.

7. The process according to claim 5, wherein $R^1$ is a cyclopentadienyl group, a substituted cyclopentadienyl group, an indenyl group or a substituted indenyl group.

* * * * *